United States Patent [19]

Chaudoir

[11] Patent Number: 4,822,981
[45] Date of Patent: Apr. 18, 1989

[54] SELF-REGULATING WARMER DEVICE FOR FOOD PRODUCTS

[75] Inventor: Roderick J. Chaudoir, Milwaukee, Wis.

[73] Assignee: Hatco Corporation, Milwaukee, Wis.

[21] Appl. No.: 63,665

[22] Filed: Jun. 19, 1987

[51] Int. Cl.$^4$ .............................................. H05B 3/14
[52] U.S. Cl. .................................... 219/385; 219/354; 219/521; 219/214; 219/504
[58] Field of Search ............... 219/385, 386, 354, 387, 219/504, 505, 521, 404, 405, 411, 214, 347, 349, 438, 441

[56] References Cited

U.S. PATENT DOCUMENTS

| | | | |
|---|---|---|---|
| 2,738,410 | 3/1956 | Ness | 219/354 |
| 2,863,979 | 12/1958 | Fitzgerald | 219/347 |
| 3,120,599 | 2/1964 | Hilgers | 219/385 |
| 3,413,442 | 11/1968 | Buiting | 219/209 |
| 3,513,296 | 5/1970 | Brangs | 219/438 |
| 3,953,711 | 4/1976 | Eck | 219/543 |
| 4,334,148 | 6/1982 | Kampe | 219/548 |
| 4,341,949 | 7/1982 | Steiner | 219/439 |
| 4,343,985 | 8/1982 | Wilson | 219/385 |

FOREIGN PATENT DOCUMENTS

| | | | |
|---|---|---|---|
| 2847830 | 3/1980 | Fed. Rep. of Germany | 219/441 |
| 55-65857 | 5/1980 | Japan | 219/438 |

OTHER PUBLICATIONS

Raychem brochure, "Thermolimit TLT Series" Dec. 1985.
"Constant Temperature Heater . . . ", Design News Oct. 20, 1986, pp. 108–109.

Primary Examiner—Teresa J. Walberg
Attorney, Agent, or Firm—John C. Cooper, III; C. Thomas Sylke; Fred Wiviott

[57] ABSTRACT

A self-regulating warmer device which is especially suited for the food service industry. Such devices are suitable, for example, for keeping wrapped or unwrapped food products at a desired holding temperature between the time the food is prepared and the time it is delivered to the customer. The warmer device includes a plate on which the food is held and a self-regulating warmer element beneath the plate to keep the plate at a uniform temperature. The plate is preferably used with spaced apart infra-red convection heaters such as those commonly used in fast food restaurants, and provides even food heating regardless of the changes in ambient conditions, the number of food products located between the infrared heater and the plate and provides dramatic reductions in power usage. Moreover, heat losses which occur at the edges of the plates now used for these applications are reduced and localized hot or cold spots are eliminated. Foor products can then be held at the mandated temperature levels required for safety considerations.

7 Claims, 1 Drawing Sheet

SELF-REGULATING WARMER DEVICE FOR FOOD PRODUCTS

BACKGROUND OF THE INVENTION

1. Field of the Invention

The present invention relates generally to the art of food warmers and more particularly to food warmers which are used to maintain wrapped or unwrapped food products at a desired temperature during the holding period between food preparation and delivery to the purchaser. In its preferred embodiment, the present invention relates to a self-regulating warmer plate in conjunction with infra-red heaters spaced apart and above the plate for use in maintaining food products at desirable temperatures in restaurants and fast food establishments.

2. Description of the Prior Art

It has been known for many years that food products must be maintained at elevated temperatures between the time they are prepared and the time they are served if there is any appreciable amount of time between the two. It is necessary to warm such foods if a time delay exists for two main reasons: the food must be warm to please the customer and the food must be kept warm to prevent bacteriological contamination. Using fast food restaurants as an example, all states have health codes requiring that food products, such as hamburgers, be maintained at a certain temperature, typically in the range of 140°–150° F.

Numerous devices have been introduced to the marketplace to accomplish the desired heating. One known system includes a planar sheet onto which the wrapped or unwarpped food products are placed and an infra-red heating system is placed above the sheet with rays from its heating bulbs directed downwardly toward the plate. By way of example, many fast food restaurants use such systems for serving a variety of sandwiches, and typically the devices used in these outlets are inclined and include divider rods, so that the sandwiches will slide in a confined path from an upper side (usually in the kitchen area) to a lower front edge where they are readily accessible to the employees serving the customers. Many shapes, sizes and heating arrangements are known for such devices, but to understand the present invention it is necessary to understand the types of problems resulting from use of these previously employed heaters.

First, the food heaters now in use are constantly being subjected to changes in ambient temperature conditions. For example, any heater which is located near an entrance door or an opening for drive-thru service may be exposed to chilling gusts of cold air. Temperatures surrounding the product holding area can also change significantly depending on the particular cooking (frying, baking, etc.) operations taking place in the kitchen area, as well as seasonal temperature changes where air conditioning or heating air flow may cause an effect.

Second, the uniformity of heating provided by known devices is significantly affected by the number and area distribution of the food objects placed on the sheet and beneath the infra-red heaters. Again using the fast food chain outlet as an example, it will be readily appreciated that a sandwich heater may include a number of rows of paper wrapped products and a number of products contained in sheet foam containers. The amount of surface area of the sheet exposed to the infra-red heaters and the location of such exposure will be constantly changing as the various products are ordered and served customers, and as the inventory of the various products is replenished from time to time by the store's chefs. Accordingly, in some areas the rays from the upper heater will be directed onto the sheet and heat the sheet from above, while in other areas, the food product will intercept and be warmed by the infra-red rays, while the sheet therebeneath will be isolated from exposure to the heating rays.

It has also been noted in these prior art devices that a considerable amount of heat is lost from the edges of the sheet, for obvious reasons, and all the aforementioned drawbacks have been addressed in part by newer systems which include a heating element in the sheet itself. In the newer systems known to the present inventor, a resistance heating wire, encased by a surrounding insulator and placed in a tape like strip of heat conductive material, such as aluminum foil, has been used. The strip is placed around the periphery of the sheet in an attempt to prevent edge heat loss. A sensor, such as a thermostat bulb is located on the lower surface of the sheet to sense the temperature of the sheet and to control when current is supplied to the wire to cause uniform heating of the strip.

Several drawbacks also exist with regard to the latter system. First, the entire sheet is heated when the thermostat senses a need for heat at the particular location of the bulb. The problem here, is that only that one area may need heat, and overheating of the other areas on the sheet will occur. Second, the application of heat around the entire perimeter of the sheet, when only local heating is required, results in wasteful energy consumption.

While these prior systems have been explained to this point with reference to fast food service slides for sandwiches, it will be readily apparent to those skilled in the art that similar problems exist in all areas of the food service industry. Just for a few examples to illustrate this point, consider a warming tray for rolls or baked potatoes at restaurants, or the holding tray for french fries in any type of food serving situation. It is readily seen then that the problem is one which exists and for a variety of wrapped and unwrapped foods.

Regulating heaters are known, and by way of example, Raychem Corporation of Menlo Park, Calif. has introduced in recent years a heater element that has provide desired results in accordance with the teachings of this invention. These heaters and are described in a 1985 technical brochure entitled "Raychem Self-Regulating Heaters". The technology involved with such heaters involves providing a pair of parallel electrodes (wires) in an insulated cable. A blend of synthetic resin and current conducting carbon particles is placed between the electrodes and is manufactured in such a way that at low temperatures current flow is permitted between the electrodes. As temperatures increase, the electrical resistance of the carbon-resin system increases thus reducing current flow and heat output. If a current is applied to a strip of such material, the aforementioned process occurs automatically and, most importantly, independently at each location along the strip, i.e., the heat output at any location is dependent almost entirely on the temperature of the strip at that location.

The manufacturer of the Raychem heaters indicates that the product is useful in distributing heat across the trailing end of an airplane wing during composite repair; that the product can be used to protect various transit, communication and weapon systems against snow and ice; that the product can be used to defrost mirrors (such as automobile rear-view mirrors); that it can be used as a diesel fuel line gel preventing system; and, that the trademarked THERMOSPACE TM convection heaters can be used to warm enclosed areas.

The present inventor is aware of one explored application using the Raychem self-regulating heaters, i.e., an attempt to use such heaters to warm enclosed dough proofing cabinets. Testing of such application did not prove to be useful, and to the knowledge of the present inventor the Raychem products have not heretofore been successfully used in the food manufacturing or food service fields.

To provide an improved food warmer system which overcomes the drawbacks mentioned above would be a significant advance in the food service field, especially if such system also possessed the controlability and power reduction advantages of the aforementioned or other self-regulating warming devices.

OBJECTS AND SUMMARY OF THE INVENTION

It is the primary object of the present invention to provide a food warmer system which overcomes the aforementioned disadvantages of prior food warming systems.

Another object of the present invention is to provide a food warmer system having reduced power input when compared to prior food warming systems.

A further object of the present invention is to provide a food warmer system which includes a food product support surface and a self-regulating device for heating portions of said surface when it is desirable to do so.

A still further object of the present invention is to provide a food warmer system which may advantageously be used with infra-red heating systems to improve heating efficiency and to improve overall economic performance.

Yet another object of the present invention is to provide a food warmer system which may be variously embodied to warm wrapped and unwrapped food products of a variety of shapes.

Another object of the present invention is to provide a food warmer system which can be variously embodied to warm food products to a variety of temperatures.

A different object of the present invention is to provide a food warmer system whose efficiency is independent of the number of food articles to be warmed or their location on the holding surface of the system.

How these and other objects of the present invention are accomplished will be described in the following detailed description of the preferred embodiment of the invention, taken in conjunction with the drawings. Generally, however, the objects are accomplished by providing a food holding, generally planar sheet of a heat conducting material such as aluminum. A strip of self-regulating heater material, such as that disclosed in the aforementioned Raychem literature, is applied to the surface of the sheet opposite to that which supports the food. The strip is applied around the periphery of the sheet or in a pattern adapted for the specific sheet shape, food product and/or sheet material. The heater is activated to produce a desired level of temperature on the food supporting service. The heated sheet of the present invention is preferably used with an infra-red heater located above and spaced apart from the sheet and arranged so that the heating rays therefrom are directed toward the sheet. The temperature level for the sheet and accordingly the temperature which will be maintained in the food product itself is selected for the type of food and the self-regulating warmer device is chosen accordingly.

DETAILED DESCRIPTION OF THE PREFERRED EMBODIMENT

Figure 1:
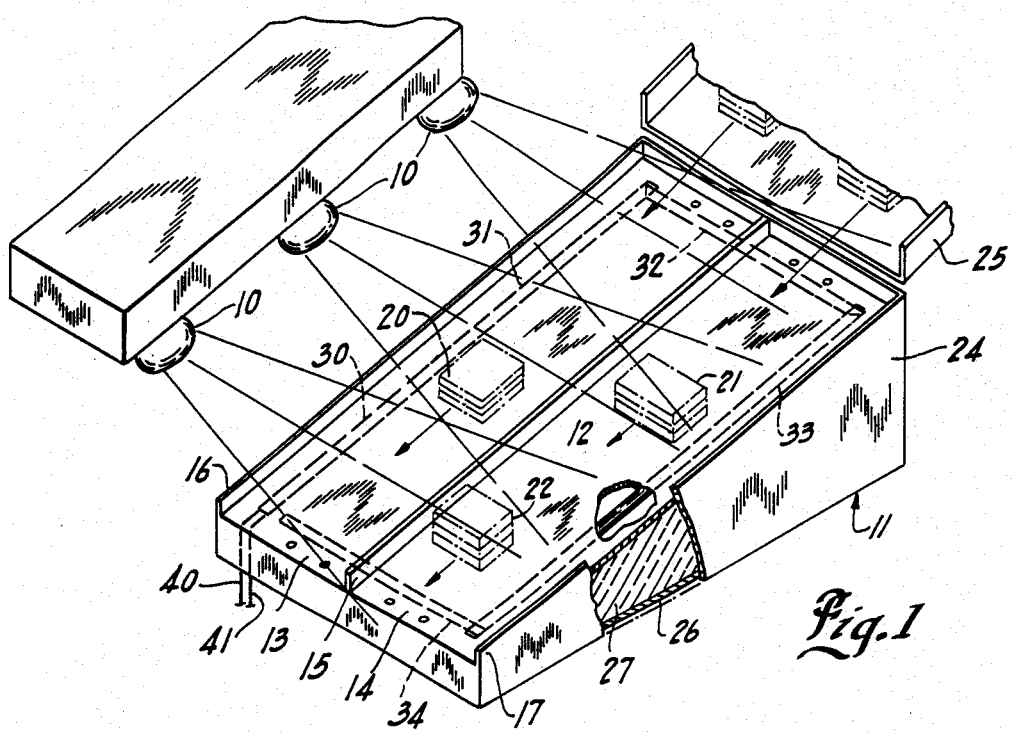
FIG. 1 is a perspective view of a food warmer station including conventional infra-red warming lamps and a conventional food delivery chute or slide modified in accordance with the present invention.

The present invention, as previously stated, relates generally to the art of food warmers, and more particularly to food warmers used to maintain wrapped or unwrapped food products at a desired temperature during the holding period between food preparation and delivery to the purchaser. A typical installation is shown in FIG. 1, wherein the food warmer station includes conventional infra-red lamps 10 being supported above a food holding unit 11 having an inclined surface 12 supporting chutes 13 and 14 separated from one another by means of an intermediate upstanding barrier or divider 15 and sides 16 and 17. The chutes maintain the individual food servings 20 and 21, 22 separated from one another during the holding period. The separation is quite usual, for instance at a fast food establishment where one type of food, such a hamburger, may be kept in chute 13 of the holding unit 11, whereas cheeseburgers may be held in chute 14 until delivered to the customer.

The holding unit 11 is illustrated with two chutes, although it may be provided with as many adjoining chutes as desired. The food is held in the lower warmer unit 24, and is originally placed in an inclined transfer unit 25. The transfer unit 25 may or may not be heated, and mainly utilized for transporting food from a food preparation area to the food serving area on the other side of a separating wall (not shown).

The food holding unit 11 is also provided with a base 26 and an insulating material 27 may be contained between the base 26 and the surface containing the chutes 13 and 14, if desired.

Figure 2:
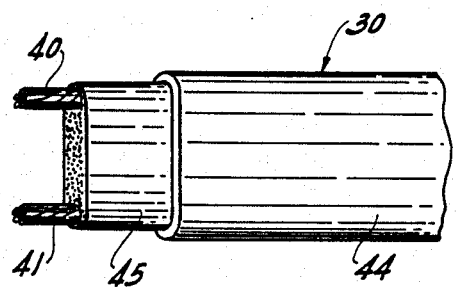
FIG. 2 is an elevational view illustrating a self-regulating warmer device unit utilized in accomplishing the function of the present invention.

The aforementioned self-regulating warmer device 30 may be positioned as shown in FIG. 1 and underlying the metallic chutes 13 and 14 in a manner that will provide a controlled heated and holding area within the boundaries of respective chutes 13 and 14. In the present case, the warmer device 30, as will be further described in connection with FIG. 2, is continuous and contains segments 31, 32, 33 and 34 folded over to provide square corners and being located at the respective opposite sides and ends of the chutes 13 and 14. Conductors 40 and 41 are connected to a source of power in accordance with conventional electrical installation techniques.

Figure 4:
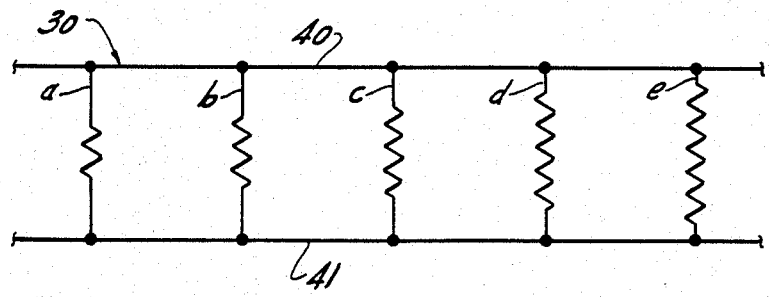
FIG. 4 is a symbolic, diagrammatic of the operating characteristics of a self-regulating heater element of a warmer device.

With reference to FIGS. 2 and 4, it will be observed that the self-regulating warmer device 30 such as the heater, offered for sale by Raychem Corporation, comprise two oppositely disposed conductors 40 and 41, which in the present case, are preferably positioned in spaced apart, parallel relationship. An insulating coating 44 surrounds the conductors 40 and 41 and a resistance material 45 comprising a blend of synthetic resin and current-conducting carbon particles or other particles of conducting material. The resistive material 45 is formed of resin and conductive particles chosen in such a way that at relatively lower temperatures, electric current flow is permitted between the electrodes, where, as the localized temperature increases, the electrical resistance of the carbon-resin system will also increase to thereby reduce current flow and heat output. When an electrical current is applied to a strip of such material 45, this change in resistance will occur automatically and independently at each location along the strip.

The material 45 of the warmer device 30 comprises a specially blended combination of polymer and conductive carbon, which creates electrical paths between the parallel electrodes 40 and 41 at each point of the warmer device 30. As the specific location warms, the core expands microscopically, increasing resistance to electrical flow and causing the heater element to reduce its heat output. As surrounding temperature cools the core, it contracts microscopically, decreasing resistance and increasing the heater output. Thus, with attention being directed to FIG. 4, the electrical diagram symbolically indicates independent locations of areas on the heater element 30 which will vary in resistance according to its own surroundings. For instance, at position a, which might merely be an uncovered area exposed to a cooler ambient temperature, the core will have contracted microscopically to create many electrical paths through the conductive carbon and provide a lesser resistance calling for a flow of electricity to thereby generate heat. In warmer sections such as sections b and c, the core will have expanded microscopically to disrupt many electrical paths. This increased electrical resistance will cause the heater element to reduce its heat output. Lastly, in hot sections, where the ambient temperature may be higher, such as the top of either of the chutes 32 and 34 of the unit 11, or where a sandwich or other item, has just been prepared and is quite warm, the microscopic core expansion will have disrupted almost all of the electrical paths. This will provide a high electrical resistance to electrical flow and the heat output will be reduced to a maintenance level.

Figure 3:
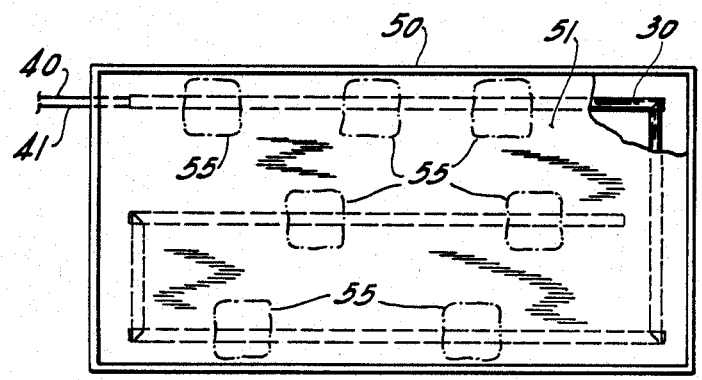
FIG. 3 is a top plan view of a food warmer tray incorporating the elements of the present invention.

With reference to FIG. 3, it will be observed that the heater unit may be used independently of infra-red lamps or other external heating means, and for instance, may be in the form of a hostess tray 50. In this case, a serpentine disposition of the unit or warmer device 30 is provided, either embedded in a molded tray or located under the floor 51 of the tray 50. Here, various hor's devoures or other preheated food servings may be placed on the tray as shown in phantom lines indicated by the reference numeral 55. It will be apparent that servings "straight from the oven" placed on the tray will heat the area surrounding the heater element, and like areas d and e of FIG. 4, the microscopic core expansion will tend to disrupt the electrical current paths and provide a relatively high resistance with heat output being reduced to a maintenance level. As the hor's devoures or other serving tends to cool, the area in the vicinity of the heater element 30 will contract and create more electrical paths through the conductive particles, calling for increased flow of electricity through the core to generate the needed energy to maintain a desired temperature of the food serving.

It will be apparent from the foregoing discussion, taken in connection with the drawing, that the improved food warmer may be used to maintain wrapped or unwrapped food products at a desired temperature during a holding period between food preparation and delivery and/or consumption of the food. The modification is of such nature that self-regulating warmer devices of the type described may be installed with minimum effort in new or existing installations. Further, because of health codes existing in each of the federal states and municiple localities, food products, such as hamburgers sold by fast food organizations, must be maintained at certain temperatures, and these temperatures may be self-regulated by food warmers made in accordance with the present invention.

What is claimed is:

1. A self-regulating, food warmer unit comprising:
    support means for individual food servings and comprising a relatively flat sheet having an exposed surface for receiving a plurality of food servings, and an oppositely disposed undersurface, and
    a self-regulating electric heater element, said heater element comprising an elongate, continuous strip including spaced apart electrical conductors and a conductive material containing a mixture of a temperature actuated, expansible/contractible synthetic resin and particles of conductive material, said strip disposed in a meandering configuration positioned on the undersurface of said sheet,
    said conductive material being positioned between and in electrical engagement with said conductors, the conductive material being characterized by expansion of said resin in localized areas proximate to said individual food servings when said individual food servings are at temperatures above a preselected temperature, and contraction of said resin when the temperature of an individual serving is reduced below the preselected temperature,
    whereby individual conductive particles are separated relative to one another during resin expansion to cause an increase in electrical resistance of said conductive material to thereby reduce current flow between the said electrical conductors, and vice versa during localized contraction of the synthetic resin caused by exposure to individual food servings of reduced temperature to thereby reduce electrical resistance and increased current flow between said conductors.

2. The food warmer unit of claim 1, wherein said support means comprises a food holder inclined to define a food serving transfer path from a food preparation area to a food dispensing location.

3. The food warmer unit of claim 2, wherein the inclined food holder is provided with divider barriers defining separating paths for delivery of food servings of different ingredients or characteristics.

4. The food warmer unit of claim 1, wherein the unit further includes radiation-type heating units spaced from said support means.

5. The food warmer of claim 4, wherein the radiation-type heating units consist of infra-red heater lamps.

6. The food warmer unit of claim 2, wherein the flat sheet of said support means comprises:
- an inclined food holder for transfer of food servings from a food preparation area to a food dispensing location, said food holder including divider barriers defining separated paths for delivery of food servings of different ingredients or characteristics.
- a self-regulating electric heater element comprising an elongated strip substantially surrounding the food holder, said heater element strip comprising spaced apart electrical conductors and a conductive material containing a mixture of a temperature actuated, expansible/contractible synthetic resin and particles of conductive material,
- said conductive material being positioned between and in electrical engagement with said conductors,
- the conductive materials being characterized by expansion of said resin in localized areas proximate to said individual food servings when said individual food servings are at temperatures above a preselected temperature, and contraction of said resin when the temperature of an individual serving is reduced below the preselected temperature,
- whereby individual conductive particles are separated relative to one another during resin expansion to cause an increase in electrical resistance of said conductive material to thereby reduce current flow between the said electrical conductors, and vice versa during localized contraction of the synthetic resin caused by exposure to individual food servings of reduced temperature to thereby reduce electrical resistance and increase current flow between said conductors.

7. A self-regulating, food warmer unit comprising a relatively flat plate having an exposed surface for receiving a plurality of food servings and an oppositely disposed undersurface, and a self-regulating electric heater element comprising an elongate, continuous strip disposed in meandering configuration position on the undersurface of said plate, whereby individual food servings may be randomly positioned on said exposed surface proximate to an adjoining area of said heater element strip, said heater element strip comprising:
- spaced apart electrical conductors and a conductive material containing a mixture of a temperature actuated, expansible/contractible synthetic resin and particles of conductive material,
- said conductive material being positioned between and in electrical engagement with said conductors,
- the conductive material being characterized by expansion of said resin in localized areas proximate to said individual food servings when said individual food servings are at temperatures above a preselected temperature, and contraction of said resin when the temperature of an individual serving is reduced below the preselected temperature,
- whereby individual conductive particles are separated relative to one another during resin expansion to cause an increase in electrical resistance of said conductive material to thereby reduce current flow between the said electrical conductors, and vice versa during localized contraction of the synthetic resin caused by exposure to individual food servings of reduced temperature to thereby reduce electrical resistance and increase current flow between said conductors.

* * * * *